(12) United States Patent
Boshears

(10) Patent No.: US 6,591,785 B1
(45) Date of Patent: Jul. 15, 2003

(54) CAT'S TOY

(75) Inventor: Rick L. Boshears, Tulsa, OK (US)

(73) Assignee: TLC International, Inc., Burlington, MA (US)

( * ) Notice: Subject to any disclaimer, the term of this patent is extended or adjusted under 35 U.S.C. 154(b) by 14 days.

(21) Appl. No.: 09/676,228

(22) Filed: Sep. 29, 2000

(51) Int. Cl.[7] ............................................. A01K 29/00
(52) U.S. Cl. ...................................... 119/707; 119/706
(58) Field of Search ................................. 119/702, 707, 119/706, 708; 180/65.6; 446/236, 242, 246, 247

(56) References Cited

U.S. PATENT DOCUMENTS

| | | | | | |
|---|---|---|---|---|---|
| 708,358 | A | * | 9/1902 | Honrath | 446/246 |
| 4,803,953 | A | * | 2/1989 | Graves | 119/29 |
| 5,517,945 | A | * | 5/1996 | Udelle | 119/83 |
| 5,540,187 | A | * | 7/1996 | Udelle et al. | 119/706 |
| 5,579,725 | A | * | 12/1996 | Boshears | 119/706 |
| 5,657,721 | A | * | 8/1997 | Mayfield et al. | 119/707 |
| 5,806,465 | A | * | 9/1998 | Baiera et al. | 119/707 |
| 5,875,736 | A | * | 3/1999 | Udelle et al. | 119/706 |
| 5,881,679 | A | * | 3/1999 | Hann | 119/708 |
| 6,024,053 | A | * | 2/2000 | Huang | 119/707 |
| 6,029,763 | A | * | 2/2000 | Swisher | 180/65.6 |

* cited by examiner

*Primary Examiner*—Peter M. Poon
*Assistant Examiner*—David Parsley
(74) *Attorney, Agent, or Firm*—Frank J. Catalano

(57) ABSTRACT

A cat's toy has a housing with a plurality of ports through its side wall, the ports being preferably substantially equally displaced. Preferably the exterior of the housing is shaped, textured and colored to look like a cheese. A plurality of play objects, one for each of the ports, are supported on a linkage within the housing. Preferably, the objects look like mice. The linkage is adapted for sequential reciprocation of at least a portion of each of the objects through its respective port so that the "mice" emerge from and return into the "cheese" in a circular sequence that entices the cat. A plurality of sensors are provided within the housing, one proximate each of the ports. The housing is adapted to permit the sensors to detect motion proximate and exterior to the housing so that the presence of the cat in the vicinity of the toy triggers the appearance and disappearance of the "mice." A drive system is responsive to each of the sensors to drive the linkage for an interval of time, prefeably approximately five seconds, following detection of motion by any of the sensors. If the cat abandons the chase and leaves the vicinity of the toy, the toy will remain deactivated after the internal elapses. The toy may also include a replaceable scratch pad secured to the upper surface of the housing.

8 Claims, 6 Drawing Sheets

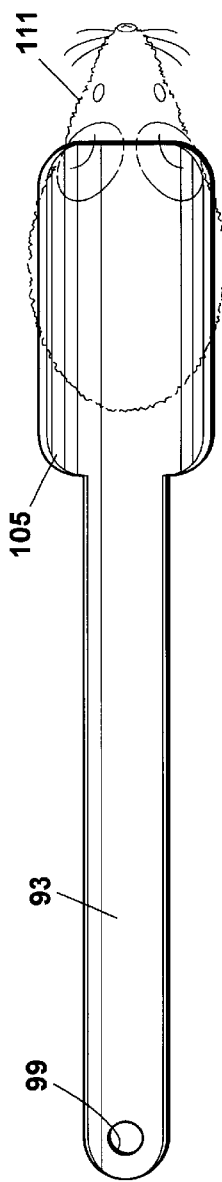
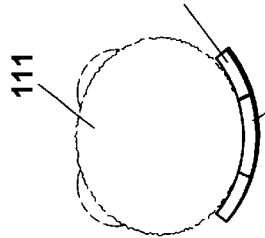
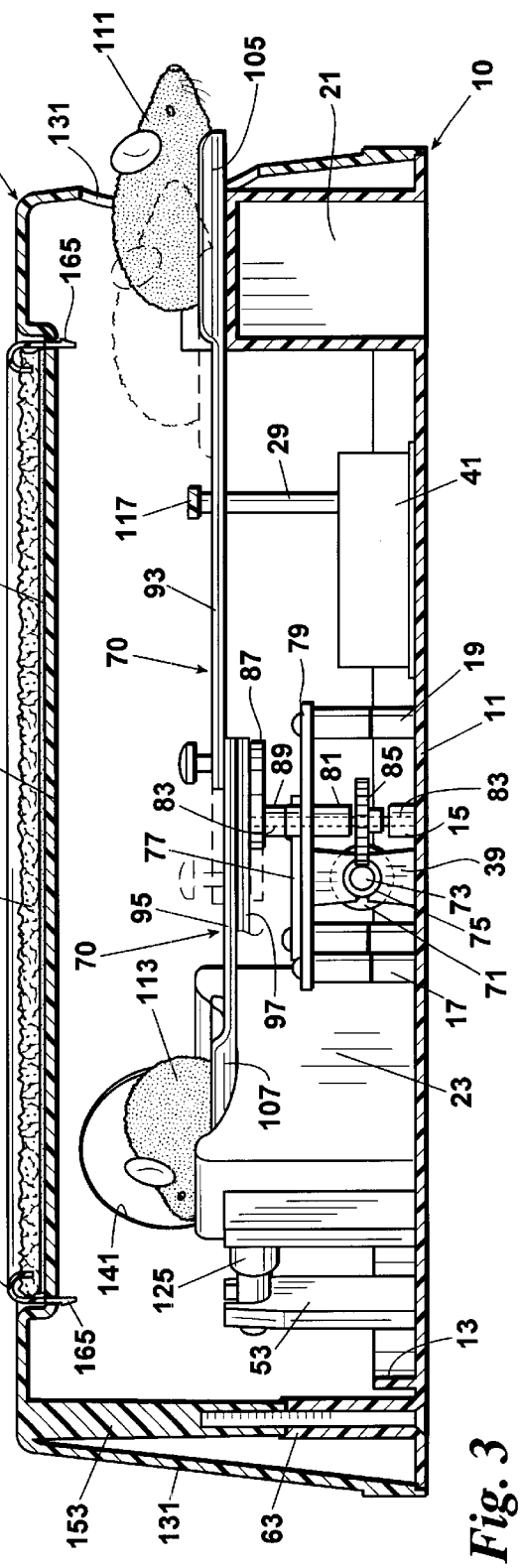
Fig. 11
Fig. 9
Fig. 10
Fig. 3

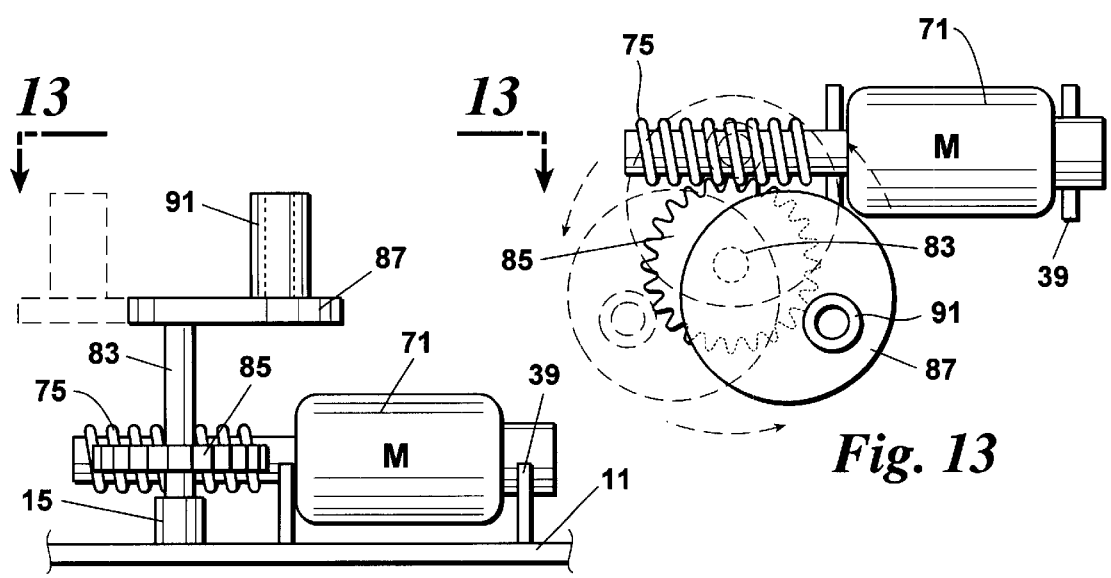
Fig. 12
Fig. 13
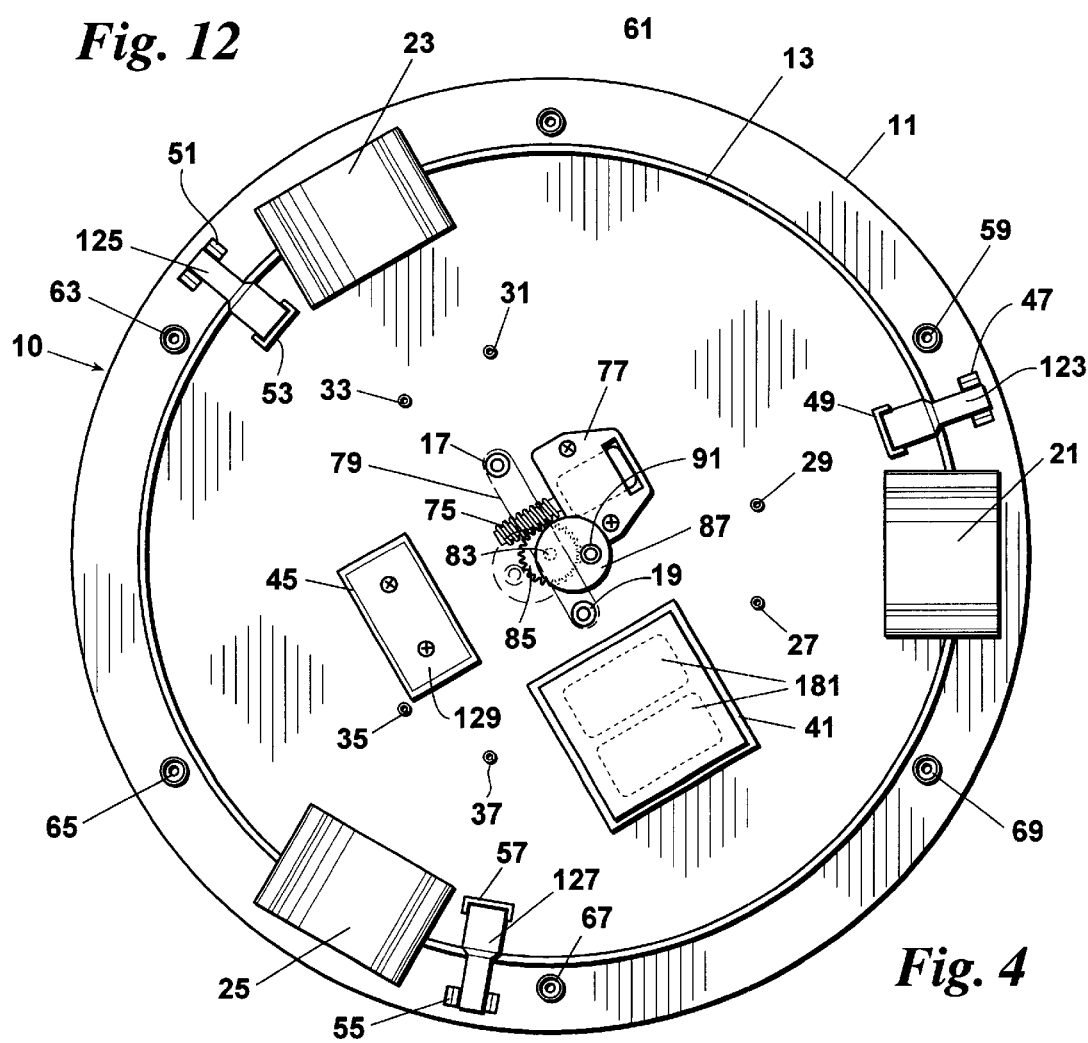
Fig. 4

CAT'S TOY

BACKGROUND OF THE INVENTION

This invention relates generally to play things for pets and more particularly concerns a toy for cats.

Cats respond to the movement of objects and particularly to the challenge of capturing and controlling moving objects. They will paw and bat objects such as balls of twine and bean bags, causing them to move, and then pounce on and play with them. They are even more responsive to objects which appear to move on their own. If the object changes its motion or ceases to move in response to contact by the cat, this further peaks the cat's interest. Toys which self-initiate motion are even more likely to stimulate the interest of the cat. Motion of multiple objects can further entice the cat into a decision making process in addition to the physical activity. And a toy that uses multiple moving objects can be played with by several cats at the same time. This is especially useful for a litter of kittens, since they can stay close to each other and share the toy without competition.

It is, therefore, an object of this invention to provide a cat toy which moves without direct stimulation by the cat. Another object of this invention is to provide a cat toy which moves without direct stimulation by the cat's owner. A further object of this invention is to provide a cat toy which self-initiates motion in response to movement of the cat in the vicinity of the toy. Yet another object of this invention is to provide a cat toy which presents a multiplicity of moving objects to the cat's attention. It is also an object of this invention to provide a cat toy which ceases movement in response to force applied to the object by the cat.

SUMMARY OF THE INVENTION

In accordance with the invention, a cat's toy has a housing with a plurality of ports through its side wall, the ports being preferably substantially equally displaced. Preferably, the exterior of the housing is shaped, textured and colored to look like a cheese. A plurality of play objects, one for each of the ports, are supported on a linkage within the housing. Preferably, the objects look like mice. The linkage is adapted for sequential reciprocation of at least a portion of each of the objects through its respective port so that the "mice" emerge from and return into the "cheese" in a circular sequence that entices the cat. A plurality of sensors are provided within the housing, one proximate each of the ports. The housing is adapted to permit the sensors to detect motion proximate and exterior to the housing so that the presence of the cat in the vicinity of the toy triggers the appearance and disappearance of the "mice." A drive system is responsive to each of the sensors to drive the linkage for an interval of time following detection of motion by any of the sensors so, if the cat abandons the chase and leaves the vicinity of the toy, the toy will remain deactivated.

In the preferred embodiment, a plurality of seats, one supporting each of the objects, slide on a plurality of guides within the housing, one guide supporting each of the seats. Preferably, each guide is a tower with a concave upper surface of arcuate cross-section and each seat has a convex lower surface substantially complimentary to the lower upper surface. The cross-sections of the upper surfaces of the towers and the lower surfaces of the seats are taken in a direction substantially transverse to a radius emanating from the crankshaft. The linkage employs a vertical crankshaft, a lever arm fixed to and extending radially from the crankshaft, a crankpin fixed proximate a distal end of the lever arm and a plurality of connecting arms extending from the crankpin, one arm extending to each of the seats. The linkage sequentially reciprocates the seats in the guides with at least a portion of each of the objects reciprocating radially through its respective port. A plurality of pairs of uprights fixed in the housing, one pair straddling each of the connecting arms, with a plurality of cross-members, one fixed across each pair of uprights, limits angular and vertical motion of the arms to prevent disengagement of the seats from their respective guides. The drive system includes an electric motor with a worm gear on its shaft meshed with a toothed gear mounted on the crankshaft. The drive motor is selected to permit force applied to any one of the objects to prevent reciprocation of the objects.

The toy may also include a scratch pad secured to the upper surface of the housing. Preferably, the housing upper surface has a circular recess and a circular scratch pad is disposed in the recess. A detachable ring is used to secure the perimeter of the pad against the perimeter of the recess so the pad can be replaced.

BRIEF DESCRIPTION OF THE DRAWINGS

Other objects and advantages of the invention will become apparent upon reading the following detailed description and upon reference to the drawings in which:

FIG. 3 is a cross-sectional view taken along the line 3—3 of FIG. 1;

FIG. 4 is a top plan view of the base portion of the toy of FIG. 1;

FIG. 9 is a side elevation view of the linkage arm, seat and mouse of the toy of FIG. 1;

FIG. 10 is a rear elevation view of the arm, seat and mouse of FIG. 9;

FIG. 11 is a top plan view of the arm, seat and mouse of FIG. 9;

FIG. 12 is an elevation view of the drive mechanism of the toy of FIG. 1;

FIG. 13 is a top plan view as seen from the line 13—13 of FIG. 12; and

Figure 2:
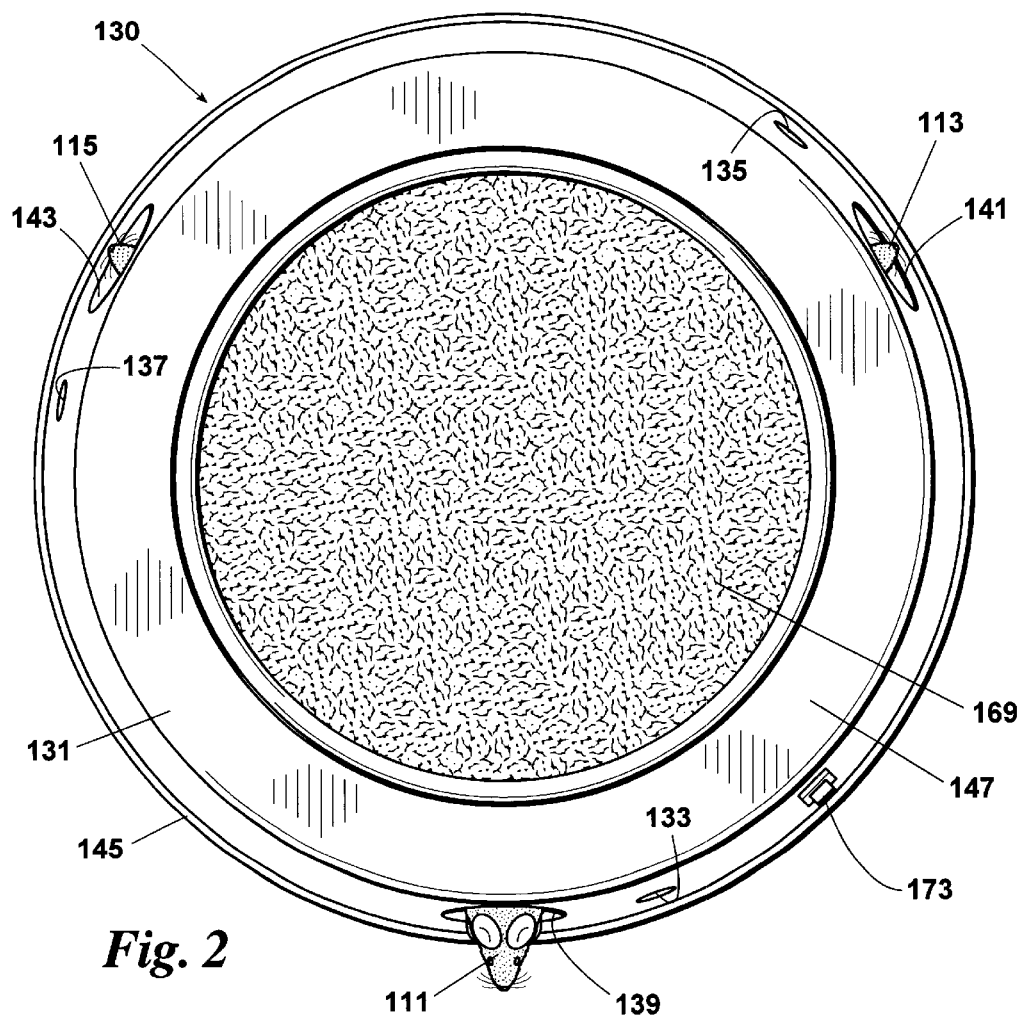
FIG. 2 is a top plan view of the toy of FIG. 1.
Figure 1:
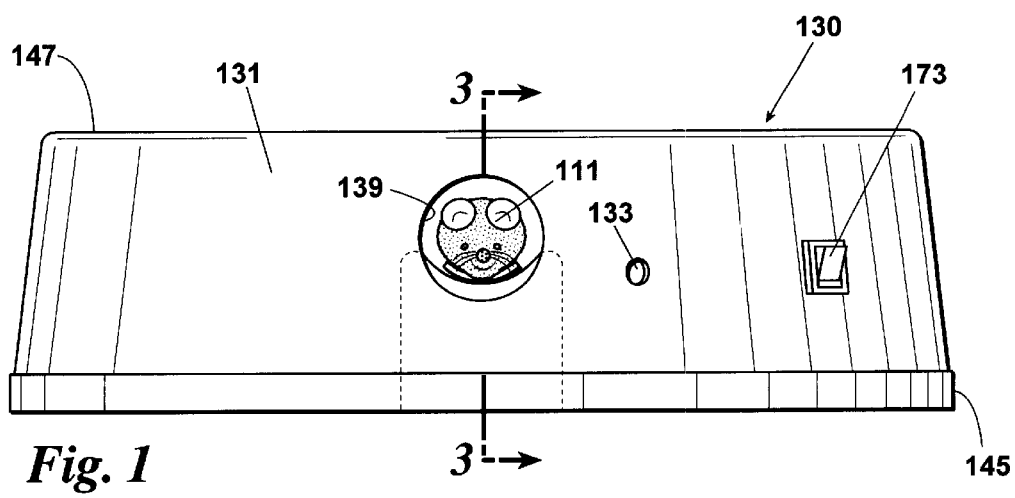
FIG. 1 is an elevation view of a preferred embodiment of the cat's toy.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Turning to FIGS. 1, 2, 3, 12 and 13, a cat's toy has a housing 10 with a plurality of ports 139, 141 and 143 through its side wall 131, the ports 139, 141 and 143 being preferably substantially equally displaced. Preferably, the exterior of the housing 10 is shaped, textured and colored to look like a cheese. A plurality of play objects 111, 113 and 115, one for each of the ports 139, 141 and 143, are supported on a linkage 70 within the housing 10. Preferably, the objects 111, 113 and 115 look like mice. The linkage 70 is adapted for sequential reciprocation of at least a portion of each of the objects 111, 113 and 115 through its respective port 139, 141 and 143 so that the "mice" emerge from and return with the "cheese" in a circular sequence that entices the cat. A plurality of sensors 123, 125 and 127 are provided within the housing 10, one proximate each of the ports 139, 141 and 143. The housing 10 is adapted to permit the sensors 123, 125 and 127 to detect motion proximate and exterior to the housing 10 so that the presence of the cat in the vicinity of the toy triggers the appearance and disappearance of the "mice." A drive motor 71 is responsive to each of the sensors 123, 125 to drive the linkage 70 for an interval of time following detection of motion by any of the sensors 123, 125 and 127 so that, if the cat abandons the chase and leaves the vicinity of the toy, the toy will remain deactivated.

Figure 5:
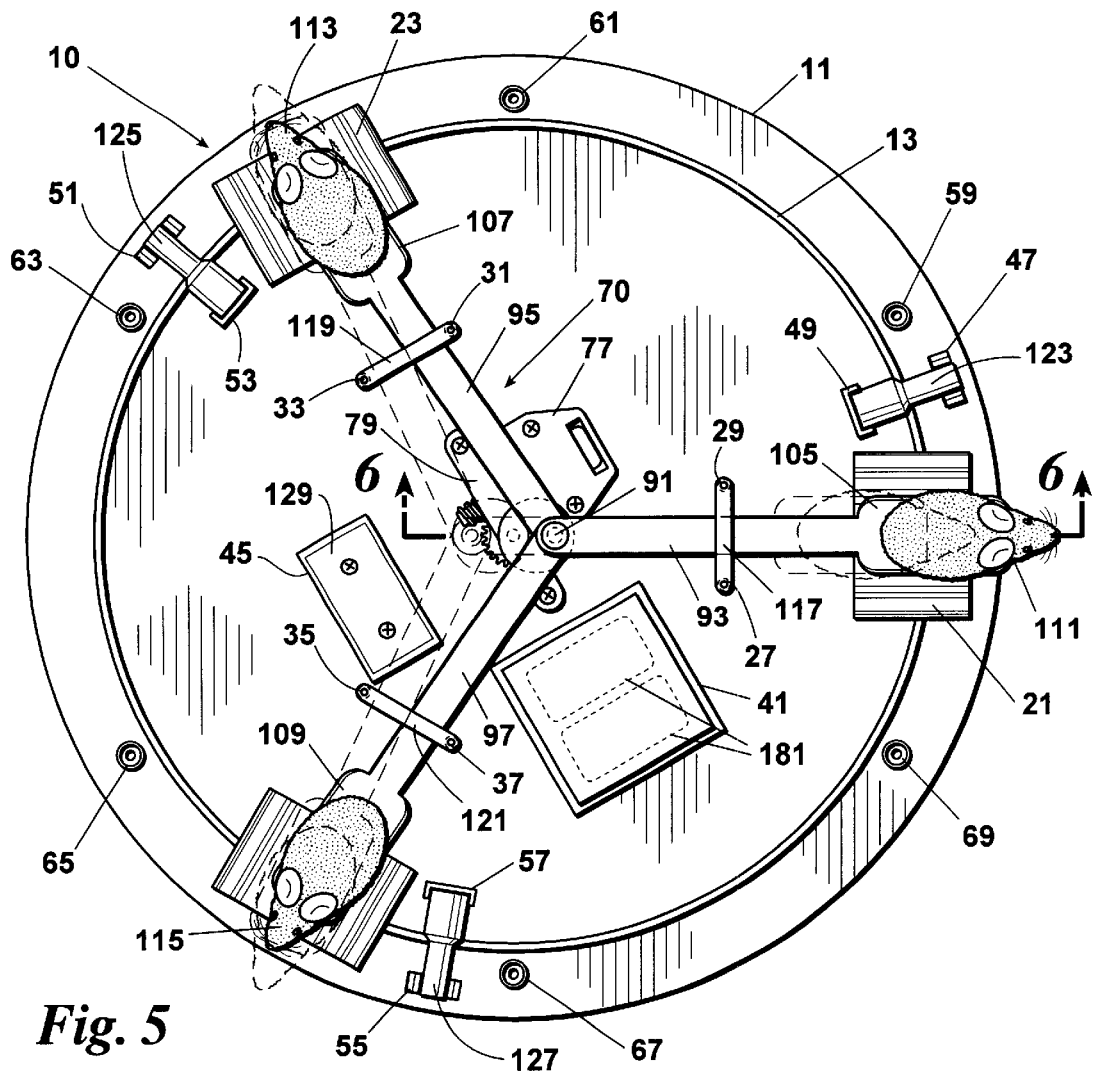
FIG. 5 is a top plan view of the base and linkage of the toy of FIG. 1.
Figure 6:
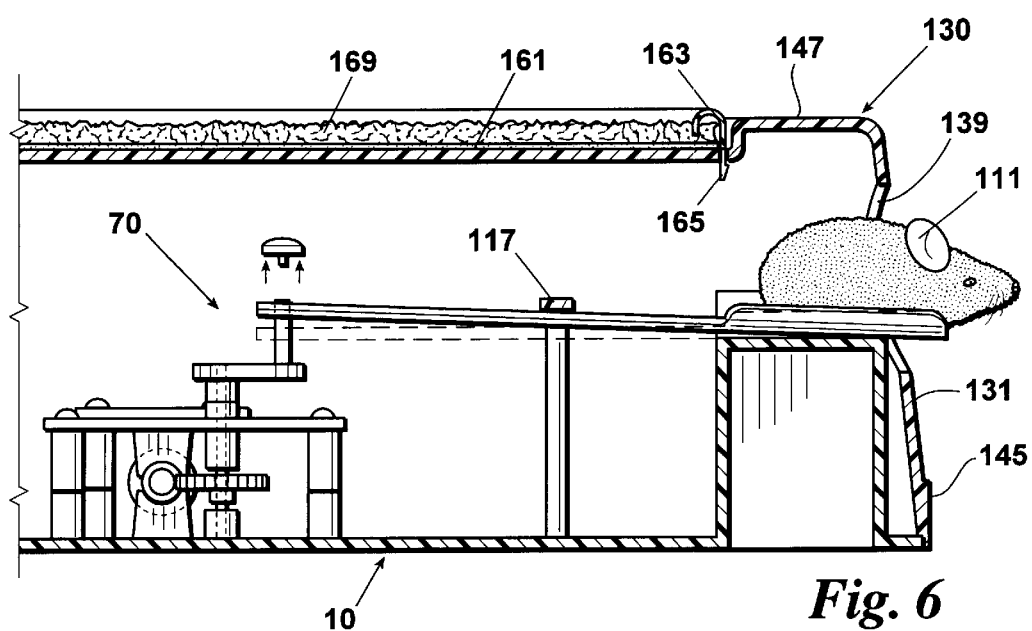
FIG. 6 is a cross-sectional view taken along the line 6—6 of FIG. 5.
Figure 7:
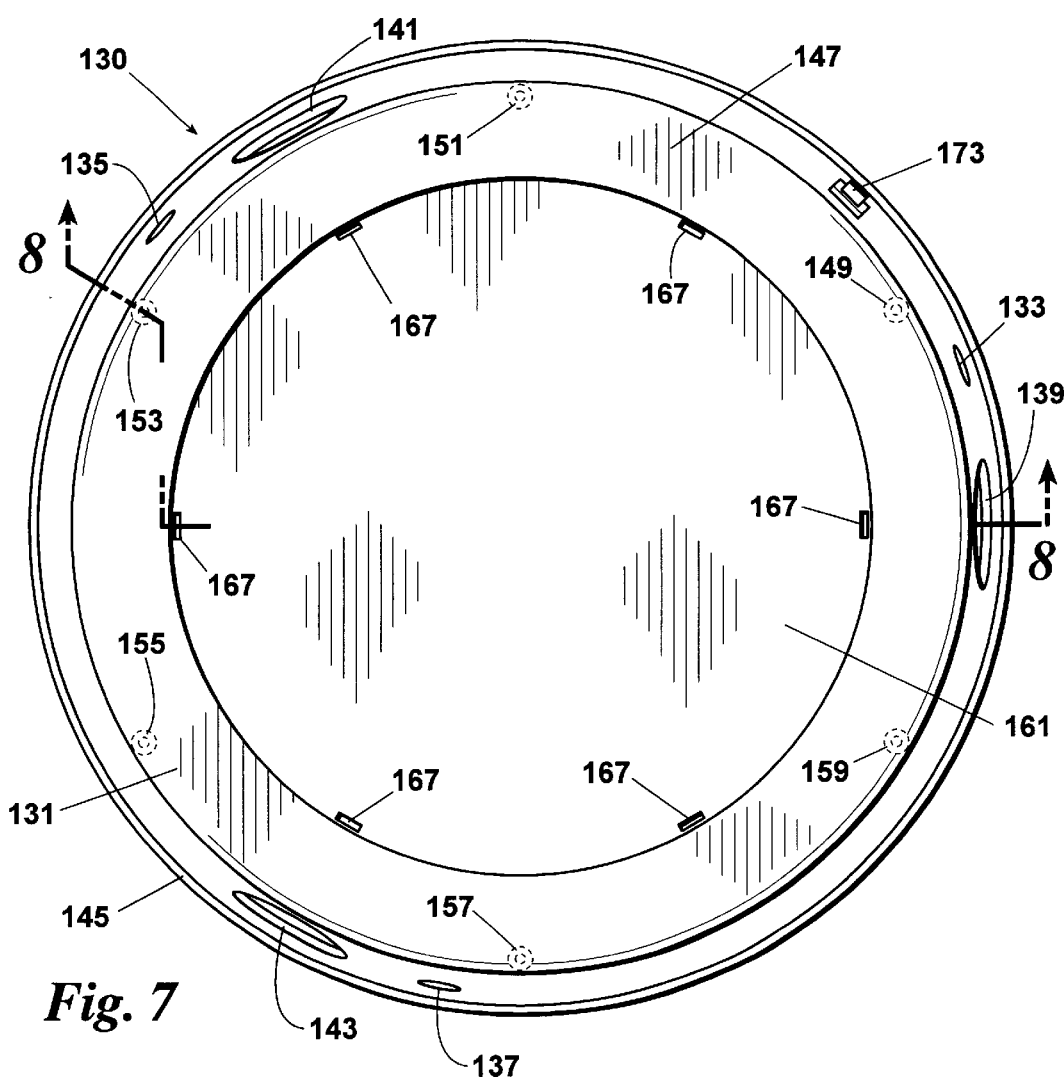
FIG. 7 is a top plan view of the cover portion of the toy of FIG. 1.
Figure 8:
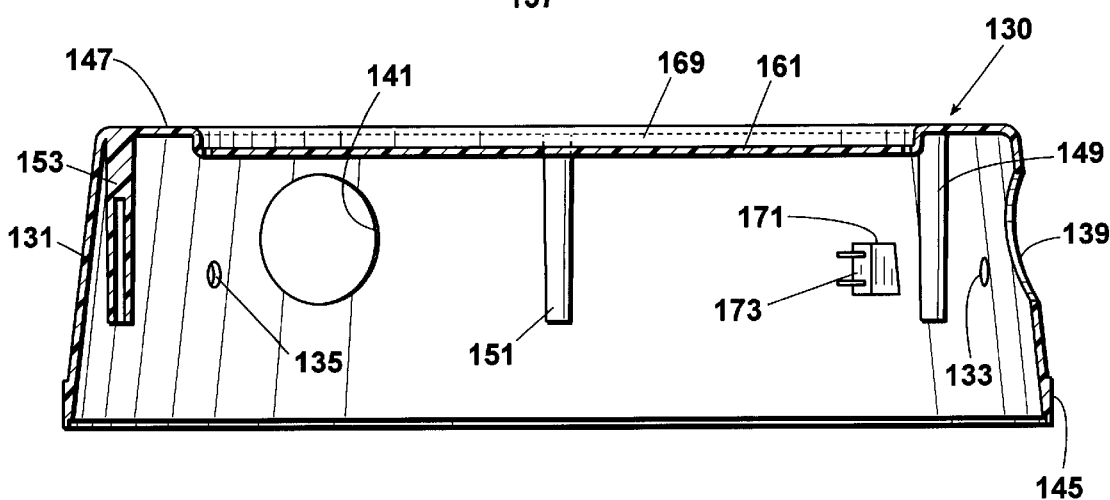
FIG. 8 is a cross-sectional view taken along the line 8—8 of FIG. 7.

As best seen in FIGS. 3, 5 and 6, a plurality of seats 105,107 and 109, one supporting each of the objects 111, 113 and 115, slide on a plurality of guides 21, 23 and 25 within the housing 10, one guide 21, 23 or 25 supporting each of the seats 105, 107 and 109. Preferably, each guide 21, 23 and 25 is a tower with a concave upper surface of arcuate cross-section and each seat 105, 107 and 109 has a convex lower surface substantially complimentary to the tower upper surface. The cross-sections of the upper surfaces of the guide towers 21, 23 and 25 and the lower surfaces of the seats 105, 107 and 109 are taken in a direction substantially transverse to a radius emanating from the crankshaft 83.

The linkage 70 shown in FIGS. 3, 5 and 6 employs a vertical crankshaft 83, a lever arm 87 fixed to and extending radially from the crankshaft 83, a crankpin 91 fixed proximate a distal end of the lever arm 87 and a plurality of connecting arms 93, 95 and 97 extending from the crankpin 91, one arm 93, 95 or 97 extending to each of the seats 105, 107 or 109. As indicated by the dashed lines of FIGS. 3, 5, 12 and 13, the linkage 70 sequentially reciprocates the seats 105, 107 and 109 in the guides 21, 23 and 25 with at least a portion of each of the objects 111, 113 and 115 reciprocating radially through its respective port 139, 141 and 143.

Looking at FIGS. 5 and 6, a plurality of pairs of uprights 27 and 29, 31 and 33 and 35 and 37 are fixed to the base 10, one pair straddling each of the connecting arms 93, 95 and 97. A plurality of cross-members 117, 119 and 121 are fixed across each pair of uprights 27 and 29, 31 and 33 and 35 and 37, respectively. Thus, the angular and vertical motion of the arms 93, 95 and 97 is limited to prevent disengagement of the seats 105, 107 and 109 from their respective guides 21, 23 and 25.

As best seen in FIGS. 12 and 13, the drive system includes an electric motor 71 with a worm gear 75 on its shaft 73 meshed with a toothed gear 85 mounted on the crankshaft 83. The drive motor 71 is selected to permit force applied to any one of the objects 111, 113 and 115 to prevent further reciprocation of the objects 111, 113 and 115 until the object 111, 113 or 115 is released.

As shown in FIGS. 2, 3, 6 and 8, the toy may also include a scratch pad 169 secured to the upper surface 147 of the housing 10. Preferably, the housing upper surface 147 has a circular recess 161 and a circular scratch pad 169 is disposed in the recess 161. A detachable ring 163 secures the perimeter of the pad 169 against the perimeter of the recess 161 so the pad 169 can be replaced.

Looking at FIGS. 1 and 3–6, the base portion 10 of the housing is seen in greater detail. A flat, circular base 11 has an annular concentric strength rib 13 proximate the outer perimeter of the base 11. A post 15 at the center of the base provides a lower bearing for the crankshaft 81. Uprights 17 and 19 straddle the lower bearing 15 and support the upper crankshaft bearing 81. In the three object toy shown, the support towers or guides 21, 23 and 25 are displaced at 120 degree intervals and, as shown, straddle the strength rib 13. However, any number of objects can be used and the intervals need not be equal. As shown, the upper surface of the guides 21, 23 and 25 has an arcuate cross-section, preferably semi-circular or nearly semi-circular as shown, the cross-section being taken in a direction substantially transverse to a radius emanating from the crankshaft bearing 15 and/or the crankshaft 83. The rotation limiting posts 27 and 29, 31 and 33 and 35 and 37 straddle radii extending from the center bearing 15 to the guides 21, 23 and 25, respectively. A motor mount 39 consisting of a substantially rectangular base adapted to support the motor 71 is positioned to permit the worm gear 75 on the shaft 73 of the motor 71 to engage with the toothed drive gear 85 on the crankshaft 83. A battery housing 41 with an opening accessible from the bottom of the base 11 has a removable cover 43. A circuit board pedestal 45 is provided proximate the battery housing 41. Three pairs of sensor support posts 47, 49, 51 and 53 and 55 and 57 are displaced at 120 degree intervals and positioned adjacent each of the guides 21, 23 and 25. As shown, the pairs of support posts 47 and 49, 51 and 53 and 55 and 57 straddle the strength rib 13 and are adapted at their upper ends to support the sensors 123, 125 and 127. Finally, the base includes lower cover support posts 59, 61, 73, 65, 67 and 69 which are displaced at 60 degree intervals and extend upwardly from the base 11 outside of the strength rib 13. The support posts have lengthwise apertures through which screws (not shown) can be inserted from the bottom of the base 11. Preferably, the base 11 and the support structures above described are integrally formed of substantially rigid plastic.

Turning again to FIGS. 3–6 and 9–13, the drive and linkage system is illustrated in detail. The motor 71 has its shaft 73 fitted with the worm gear 75. The motor is seated on the motor mount 39 and secured in place by a clamping plate 77 extending over the motor 71. A cross bar 79 straddles the uprights 17 and 19 and supports the upper crankshaft bearing 81. The crankshaft 83 extends through the upper bearing into the lower bearing 15. The toothed drive gear 85 is mounted on the crankshaft 83 between the upper and lower bearings 81 and 15 and is meshed with the worm gear 75. A lever arm, shown as an eccentric disk 87, extends radially from the crankshaft 83, as shown by extending the crankshaft 83 into a post 89 downwardly depending from the disk 87. The crank pin 91 extends upwardly from the distal end of the lever arm, as shown at the perimeter of the eccentric disk 87. Three arms 93, 95 and 97 are pivotally engaged through mounting holes 99, 101 and 103 on the crankpin 91 and are supported by the lever or disk 87. A cap, best seen in FIG. 6, may be provided on the upper end of the crank pin 91 to assure that the arms 93, 95 and 97 will not disengage from the crankpin 91. The distal ends of the arms 93, 95 and 97 have seats 105, 107 and 109. As best seen in FIGS. 9–11, the seats 105, 107 and 109 have convex lower surfaces which are substantially complementary to the upper surfaces of the guides 21, 23 and 25. Looking at FIG. 5, the length of the arms 93, 95 and 97 is such that, when the arms 93, 95 and 97 are pivotally connected on the crank pin 91, the distal ends of the seats 105, 107 and 109 will extend to approximately the outermost edges of the guides 21, 23 and 25 when the lever or disk 87 is rotated to a position of maximum extension of the arms 93, 95 or 97. The objects or mice 111, 113 and 115 are mounted on the seats 105, 107 and 109 for reciprocation with the seats 105, 107 and 109 and extend from the seats 105, 107 and 109 outwardly from the center of the base 11. The cross bars 117, 119 and 121 extend over their respective pairs of limiting posts 27 and 29, 31 and 33 or 35 and 37 and above the arms 93, 95 and 97. Thus, the angular and vertical movement of the arms 93, 95 and 97 is limited so as to prevent the seats 105, 107 and 109 from disengaging from their respective guides 21, 23 and 25. The sensors 123, 125 and 127 are seated in the adapted upper ends of their respective sensor support posts 47 and 49, 51 and 53 and 55 and 57. The circuit board 129 on which the system electrical circuits 180 are mounted is seated on the circuit board pedestal 45. Pairs of wires extend from the battery housing 41, the sensors 123, 125 and 127, and the motor 71 to the circuit board 129.

Turning to FIGS. 1–3 and 6–8, the housing further includes a cover 130. The cover sidewall 131, as shown, preferably is slightly tapered so as to narrow from bottom to top. In the preferred three object embodiment, the cover sidewall 131 has three small sensor holes 133, 135 and 137 displaced at 120 degree intervals for alignment with the sensors 123, 125 and 127, respectively. The sensors 123, 125 and 127 and holes 133, 135 and 137 are aligned to permit detection of motion proximate and exterior to the toy. The object or mouse holes 139, 141 and 143 are displaced at 120 degree intervals in the cover sidewall 131 for alignment with the arcuate upper surfaces of the guides 21, 23 and 25. The distance from the crankpin 91 to the distal ends of the objects or mice 111, 113 and 115 is such that, when the seats 105, 107 or 109 are maximally extended, the mice 111, 113 or 115 protrude significantly from the mouse holes 139, 141 and 143 and, when the seats 105, 107 and 109 are least extended, the mice 111, 113 and 115 are fully withdrawn inside the cover sidewall 131. An annular seat 145 is provided in the lower perimeter of the cover sidewall 131 so that the sidewall 131 will overlap the perimeter of the base 10. The cover top face 147 has downwardly extending cover mounts 149, 151, 153, 155, 157 and 159 which are internally threaded and aligned to receive screws (not shown) through the base cover support posts 59, 61, 63, 65, 67 and 69, respectively. Preferably, a concentric annular seat 161 is provided in the cover top face 147 and a snap ring 163 with snaps 165 such as resiliently flexible tabs with ears are engagable in slots 167 in the cover top face 147. The replaceable scratch pad 169 is disposed in the seat 161 and is held in place by the snap ring 163 which extends along the perimeter of the annular seat 161 and snaps into tight engagement against the scratch pad 169. The cover sidewall 131 also has a switch aperture 171, preferably disposed proximate a midpoint between two of the mouse holes 139, 141 and 143, so as to minimize the likelihood that the cat will inadvertently operate the on/off switch 173. A pair of wires (not shown) extend from the ON/OFF switch to the circuit board 129. The cover sidewall 131 and the cover top face 147 preferably have the external shape, texture and color of cheese so that the toy will provide the overall appearance of mice emerging from and disappearing into the cheese.

Figure 14:
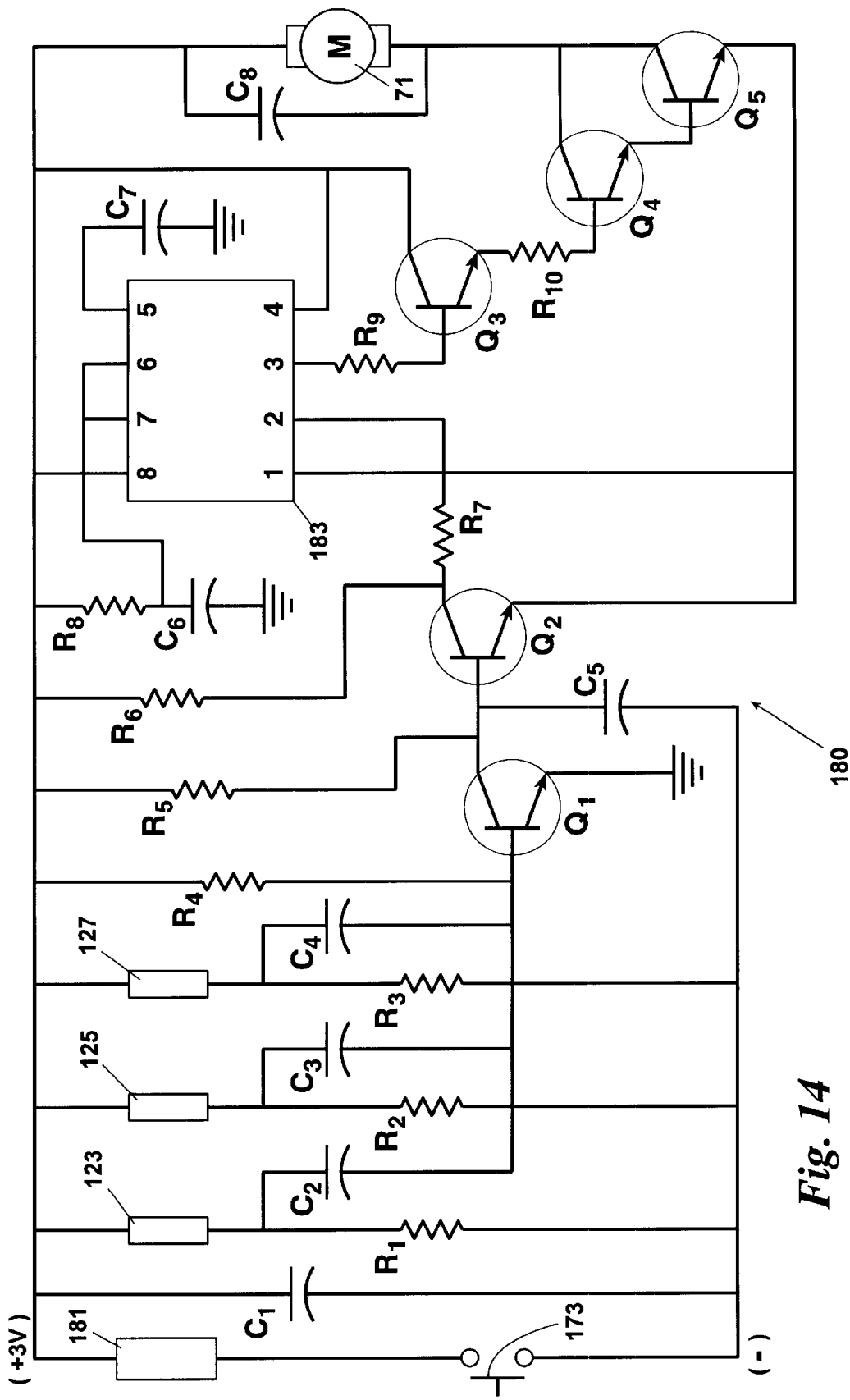
FIG. 14 is a schematic diagram of the electrical system of the toy of FIG. 1

The toy electrical system 180 is shown in FIG. 14. The power source 181, preferably two each 1½ volt batteries, is connected through the ON/OFF switch 173 to a circuit configured to drive the linkage 70 for a period of approximately five seconds after detection by any one of the sensors 123, 125 or 127 of movement within an approximate three to five foot radius of the toy. The motor 71 and circuit components are chosen so that, if the cat applies force to any of the objects or mice 111, 113 or 115, the motor shaft 73 will cease to rotate without damaging the motor 71 for as long as force is applied. As long as motion continues within the range of the sensors 123, 125 and 127, the drive motor 71 will be reactivated in five second intervals. Any circuit configuration that accomplishes these results is suitable to the invention. The electrical system of the prototype device is shown in FIG. 14, the circuit components being identified as follows:

| Alphanumeric Reference | Description |
| --- | --- |
| 181 | 2 @ 1.5 v batteries |
| $C_1$ | 47 µf 10 v capacitor |
| $R_1$ | 150 kΩ resistor |
| $C_2$ | 2.2 µf 16 v capacitor |
| $R_2$ | 150 kΩ resistor |
| $C_3$ | 2.2 µf 16 v capacitor |
| $R_3$ | 150 kΩ resistor |
| $C_4$ | 2.2 µf 16 v capacitor |
| $Q_1$ | 9013 transistor |
| $R_4$ | 4.7–5.1 µΩ resistor |
| $R_5$ | 100 kΩ resistor |
| $C_5$ | 0.1 µf capacitor |
| $Q_2$ | 9013 transistor |
| $R_6$ | 75 kΩ resistor |
| $R_7$ | 10 kΩ resistor |
| 183 | NE 555 3 v (I.C.) |
| $C_6$ | 22 µf 16 v capacitor |
| $R_8$ | 1 µΩ resistor |
| $C_7$ | 0.1 µf capacitor |
| $Q_3$ | 9013 transistor |
| $R_9$ | 100–200Ω resistor |
| $R_{10}$ | 10Ω resistor |
| $Q_4$ | 9013 transistor |
| $Q_5$ | 5551 transistor |
| $C_8$ | By-pass capacitor |
| $D_{S1}$ | Directional light sensors (by CDS) |
| $D_{S2}$ | Directional light sensors (by CDS) |
| $D_{S3}$ | Directional light sensors (by CDS) |
| 71 | Motor 2–3 v dc, 4300 rpm ± 300 (by Daishan Yingda) |
| 173 | Switch |

While the preferred embodiment includes three sequentially reciprocated objects with the appearance of mice, any number of one or more objects can be used by extending an appropriate number of linkages from the crankpin 91 to the desired number of object ports in the cover sidewall 131. The displacements between objects need not be equal. The external appearance of the housing 10 can be modified in shape, texture and color. The arm lengths or lever arrangements can be dimensioned to cause variation or consistency in the sequence of emergence and disappearance of the objects from the toy. The operating times and range of the sensors can be varied. It is not necessary to have an equal number of sensors and objects.

Thus, it is apparent that there has been provided, in accordance with the invention, a cat's toy that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A cat's toy comprising:

a housing having a plurality of ports through a wall thereof;

a plurality of objects, one for each of said ports;

a plurality of seats, one supporting each of said objects;

a plurality of guides within said housing, one supporting each of said seats;

a linkage within said housing having a vertical crankshaft, a lever arm fixed to and extending radially from said crankshaft, a crankpin fixed proximate a distal end of said lever arm and a plurality of connecting arms extending from said crankpin, one said arm extending to each of said seats, said linkage sequentially reciprocating said seats in said guides with at least a portion of each of said objects reciprocating through its respective port;

a plurality of sensors within said housing, one proximate each of said ports, said housing being adapted to permit said sensors to detect motion proximate and exterior thereto; and means responsive to each of said sensors for driving said crankshaft for an interval of time following detection of motion by any of said sensors.

2. A cat's toy according to claim 1, said guides each comprising a tower having a concave upper surface of arcuate cross-section taken in a direction substantially transverse to a radius emanating from said crankshaft.

3. A cat's toy according to claim 2, said seats each having a convex lower surface substantially complimentary to said tower upper surface.

4. A cat's toy according to claim 1 further comprising a plurality of pairs of uprights fixed in said housing, one pair straddling each of said connecting arms to limit angular motion of said arms and prevent disengagement of said seats from their respective guides.

5. A cat's toy according to claim 4 further comprising a plurality of cross-members, one fixed across each said pair of uprights to limit vertical motion of said arms and prevent disengagement of said seats from their respective guides.

6. A cat's toy according to claim 1, said housing having a circular recess in an upper surface thereof, a circular scratch pad being disposed in said recess.

7. A cat's toy according to claim 6 further comprising a ring securing a perimeter of said pad against a perimeter of said recess.

8. A cat's toy according to claim 7, said ring being detachably engaged with said housing.

* * * * *